(12) United States Patent
Braithwaite et al.

(10) Patent No.: US 10,632,804 B2
(45) Date of Patent: Apr. 28, 2020

(54) ROBOTIC VEHICLE

(71) Applicant: Imperial College Innovations Limited, London (GB)

(72) Inventors: Adam Braithwaite, London (GB); Talib Alhinai, London (GB); Mirko Kovac, London (GB)

(73) Assignee: Imperial College Innovations Limited, London (GB)

( * ) Notice: Subject to any disclaimer, the term of this patent is extended or adjusted under 35 U.S.C. 154(b) by 98 days.

(21) Appl. No.: 15/578,627

(22) PCT Filed: May 18, 2016

(86) PCT No.: PCT/GB2016/051426
§ 371 (c)(1),
(2) Date: Nov. 30, 2017

(87) PCT Pub. No.: WO2016/193666
PCT Pub. Date: Dec. 8, 2016

(65) Prior Publication Data
US 2018/0312023 A1    Nov. 1, 2018

(30) Foreign Application Priority Data

Jun. 1, 2015  (GB) ..................................... 1509511

(51) Int. Cl.
*B64C 39/00* (2006.01)
*B60F 5/02* (2006.01)
(Continued)

(52) U.S. Cl.
CPC *B60F 5/02* (2013.01); *B25J 5/00* (2013.01); *B25J 15/0028* (2013.01); *B29C 64/165* (2017.08); *B29C 64/209* (2017.08); *B33Y 30/00* (2014.12); *B33Y 50/02* (2014.12); *B33Y 80/00* (2014.12); *B60F 5/00* (2013.01); *B62D 57/02* (2013.01); *B62D 57/024* (2013.01); *B63G 8/001* (2013.01); *B64C 37/00* (2013.01); *B64C 39/024* (2013.01); *B64C 39/08* (2013.01);
(Continued)

(58) Field of Classification Search
None
See application file for complete search history.

(56) References Cited

U.S. PATENT DOCUMENTS 2,918,738 A * 12/1959 Barr ....................... B62D 57/00
                                                    37/347
4,527,650 A * 7/1985 Bartholet ............. B62D 57/032
                                                    180/8.6
(Continued)

FOREIGN PATENT DOCUMENTS

CN      103522853      1/2014
CN      104723814      6/2015
(Continued)

OTHER PUBLICATIONS https://hackaday.com/2012/12/18/the-hexapod-hexacopter/ (Year: 2012).*
https://www.youtube.com/watch?v=MZhtJOGGnOg (Year: 2015).*
https://www.bbc.com/news/technology-27311292 (Year: 2014).*
GB Search Report for corresponding GB Application No. GB 1509511.0 dated Oct. 21, 2015 7 pages.
PCT Search Report for corresponding PCT International Application No. PCT/GB2016/051426 dated Dec. 12, 2016, 6 pages.

*Primary Examiner* — Timothy Kennedy
(74) *Attorney, Agent, or Firm* — Lee & Hayes, P.C.

(57) ABSTRACT

A robotic vehicle has legs and propellers to enable it to walk, fly, and or swim.

16 Claims, 8 Drawing Sheets

(51) Int. Cl.
  *B63G 8/00* (2006.01)
  *B33Y 80/00* (2015.01)
  *B60F 5/00* (2006.01)
  *B62D 57/02* (2006.01)
  *B33Y 30/00* (2015.01)
  *B33Y 50/02* (2015.01)
  *B29C 64/209* (2017.01)
  *B29C 64/165* (2017.01)
  *B25J 5/00* (2006.01)
  *B25J 15/00* (2006.01)
  *B62D 57/024* (2006.01)
  *B64C 37/00* (2006.01)
  *B64C 39/02* (2006.01)
  *B64C 39/08* (2006.01)
  *B05B 13/00* (2006.01)
  *B33Y 10/00* (2015.01)

(52) U.S. Cl.
  CPC ............ *B05B 13/005* (2013.01); *B33Y 10/00* (2014.12); *B63G 2008/002* (2013.01); *B64C 2201/027* (2013.01); *B64C 2201/12* (2013.01); *B64C 2201/126* (2013.01)

(56) References Cited

U.S. PATENT DOCUMENTS

| | | | | |
|---|---|---|---|---|
| 6,974,356 B2 * | 12/2005 | Hobson | ................. | B60F 3/0007 244/22 |
| 2013/0269585 A1 | 10/2013 | Kim et al. | | |
| 2014/0339355 A1 | 11/2014 | Olm et al. | | |
| 2015/0274294 A1 * | 10/2015 | Dahlstrom | ............... | B64D 1/18 239/722 |
| 2016/0130000 A1 * | 5/2016 | Rimanelli | ............. | B64C 39/024 244/2 |

FOREIGN PATENT DOCUMENTS

| | | |
|---|---|---|
| CN | 104773042 | 7/2015 |
| CN | 105460099 | 4/2016 |
| ES | 2525773 | 12/2014 |
| KR | 20130098062 | 9/2013 |
| WO | WO2012087033 | 6/2012 |
| WO | WO2013089442 | 6/2013 |

\* cited by examiner

ROBOTIC VEHICLE

This Application is a 371 national phase application of international application number PCT/GB2016/051426 filed on May 18, 2016, which claims priority to GB Patent Application No. 1509511.0 filed on Jun. 1, 2015, which is incorporated herein by reference.

FIELD

This disclosure relates to a robotic vehicle. In particular, but without limitation, this disclosure relates to a robotic vehicle capable of walking, flying, and/or propelling itself in a fluid.

BACKGROUND

Robotic vehicles have useful applications in fields where human performance of a task is not possible, for example in dangerous environments, and in fields where human precision is not sufficiently high and/or human concentration for repetitive tasks is too low.

SUMMARY

Aspects and features of the invention are set out in the appended claims.

BRIEF DESCRIPTION OF THE DRAWINGS

Examples of the present disclosure will now be explained with reference to the accompanying drawings in which.

DETAILED DESCRIPTION

Figure 1:
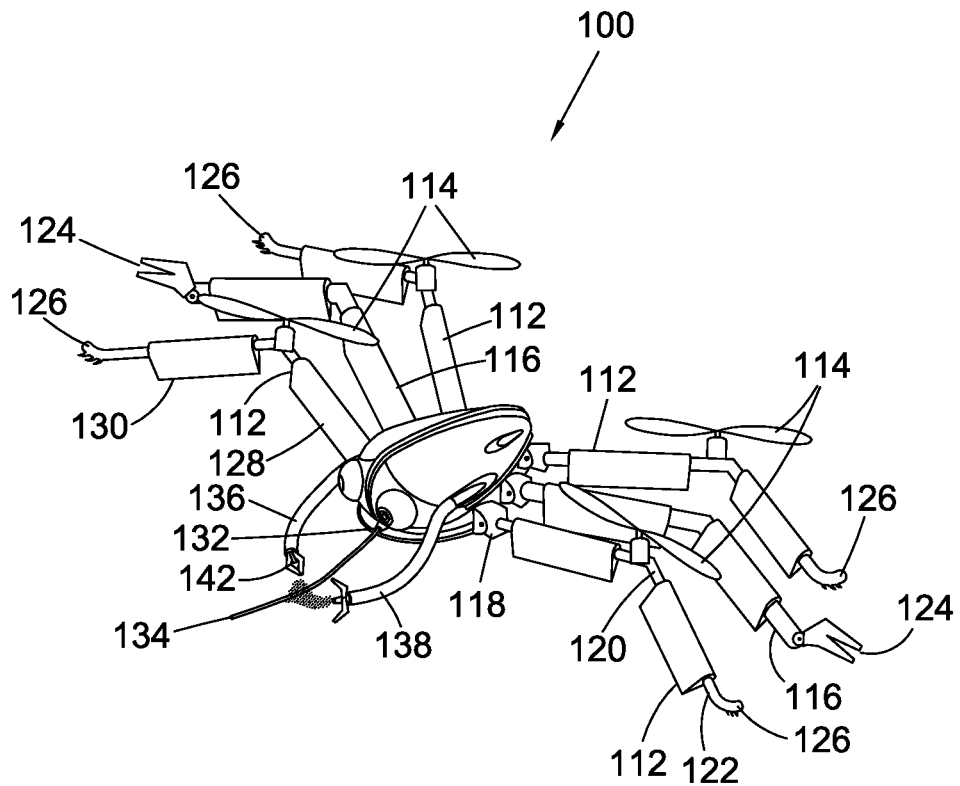
FIG. 1 shows an example robotic vehicle.

FIG. 1 shows a robotic vehicle 100 having a body 110, a plurality of moveable legs 112 each having a propeller 114 rotatably coupled thereto. The robotic vehicle being operable, by way of a controller (not shown in FIG. 1) to move the legs 112 relative to the body, so as to enable the robotic vehicle 100 to walk. The robotic vehicle being further operable, by way of the controller to cause the propellers 114 to rotate relative to the legs 112 so as to provide thrust for the robotic vehicle 100 to use either for flying, or, when the robotic vehicle 100 is in a liquid—either floating thereon or being submerged therein, to propel the robotic vehicle 100 relative to the liquid.

The robotic vehicle further has a plurality of additional legs 116 which, like the other legs 112 are moveable relative to the body 110 and are able to assist with walking. However, and unlike the other legs 112, the additional legs 166 do not have propellers coupled thereto.

The legs 112, 116 of FIG. 1 each have a knee joint 120 and an upper leg portion 118 moveably coupled to the body 110 and the knee joint 120 and a lower leg portion 122 moveably coupled to the knee joint 120 so as to be moveable relative to the upper leg portion 118. The controller being operable to cause the lower leg portion 122 to move relative to the upper leg portion 118 so as to cause a distal end of the lower leg portion 122 to move closer to or further away from a proximal portion of the upper leg portion 118. The controller being further operable to cause the lower leg portion 122 to twist relative to the knee joint 120.

Each leg 112, 116 is moveably coupled to the body 110 by a joint having multiple degrees for freedom, for example a three degree of freedom joint being moveable so as to change pitch, roll, and yaw. When combined with a knee joint, the leg is moveable with four degrees of freedom.

In FIG. 1, the additional legs 116 each have a manipulator element 124 at a distal end of their lower leg portions, the manipulator element comprising a pair of pivoting opposed jaws that the controller is operable to cause to open and shut so as to enable the manipulation of objects. In FIG. 1, the other legs each have a number of protruding portions 126 at distal ends of their lower leg portions 122 to facilitate walking and gripping by those legs when their distal ends are incident upon objects.

In FIG. 1, each leg 112, 116 carries first and second wing portions (128, 130 respectively). In particular, each upper leg portion 118 carries a respective first wing portion and each lower leg portion 122 carries a respective second wing portion 130. The wing portions 128, 130 are configured so that, when the robotic vehicle is in a fluid flow, for example, when the robotic vehicle is moving through a liquid, or flying in a gas, the profiles of the wing portions influence the fluid flow. This can provide lift to the robotic vehicle, provide it with steering capabilities and/or may enable it to glide. As one possibility, the wing portions are formed so as to be aerofoils in themselves. As each leg 112, 116 is twistably moveable relative to the body 110, twisting of that leg can enable a change in the influence of the wing portions with respect to a fluid flow to be effected. Likewise, a twist of the knee joint can enable a change in the influence of a second wing portion with respect to a fluid flow to be effected. As another possibility in addition or alternatively to the upper leg joint with the body and/or the knee joint being twistable, each wing portion 128, 130 may be rotatably moveable with respect to the leg portion upon which it is mounted. Flight energy (defined as motor power consumption) may increase as a consequence of the presence of the wing portions, but flight speed will increase by a far greater proportion, hence dramatically increasing the spatial endurance of the aerial device by around 50% when compared to a similar system without such wing portions. Furthermore, the twistable nature of the upper leg portions in relation to the body 110 in conjunction with the wing portions can enable the propellers 114 to be moved between a horizontal plane (for hovering) and a vertical plane (for forward direction airplane like motion).

Figure 2:
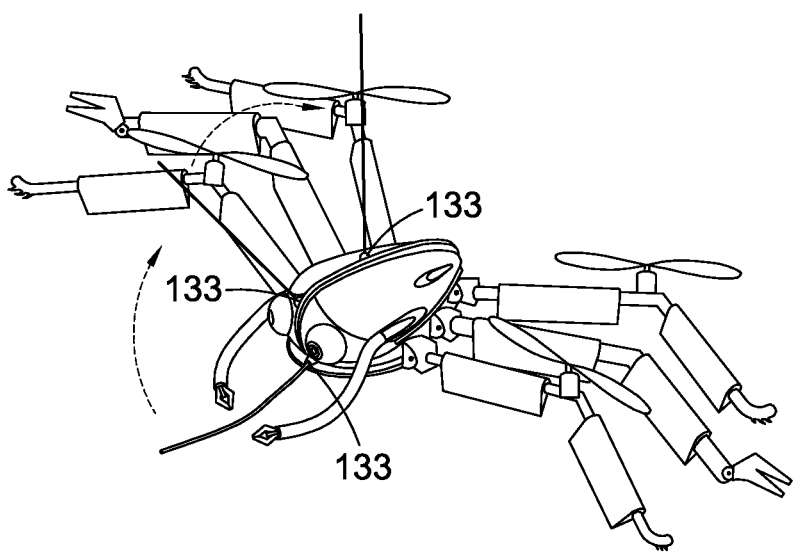
FIG. 2 shows the vehicle of FIG. 1 moving a filament dispenser.

The robotic vehicle 100 of FIG. 1 further comprises a filament dispenser 132 operable to dispense and/or retract a filament 134 from the body 110 of the robotic vehicle. The filament dispenser 132 is operable, as shown in FIG. 2, to move an outlet of the filament dispenser 133 relative to the body of the robotic vehicle so as to enable the filament 134 to be dispensed and/or retracted in different directions relative to the body 110 of the robotic vehicle 100. The filament 134 may be used in order to aid movement/positioning if the robotic device, for example it may abseil using the filament or move like a spider suspended from its thread. The filament may additionally or alternatively be used for construction/manipulation—for example to weave a structure prior to application of a solidifying solution—and the filament dispenser 134 is accordingly operable to sever the filament—for example by way of a bladed tool (not shown).

The robotic vehicle 100 of FIG. 1 further has a pair of arms 136, 138 moveably coupled to the body 110. In this case the arms 136, 138 are formed of a plurality of moveable segments thereby giving the arms a high number of degrees of freedom. At the distal end of one of the arms 138 is a substance dispenser 140, in this case a spray nozzle, for dispensing a curable substance such as a glue, resin, or compound for 3D printing. The other of the arms 136 has a manipulator 142, in this case a three jawed pincer.

The robotic vehicle of FIG. 1 further has a pair of cameras 144, in this case compound cameras, arranged to provide sensor input for operating the robotic vehicle 100.

It will be understood that known means are available for controlling the articulation of the various joints described herein. In particular, actuators for articulating the leg and arm joints, the wing portions, the manipulators, propellers, and filament dispenser include servo motors, solenoids, electrically activatable memory materials, and motors.

Figure 3:
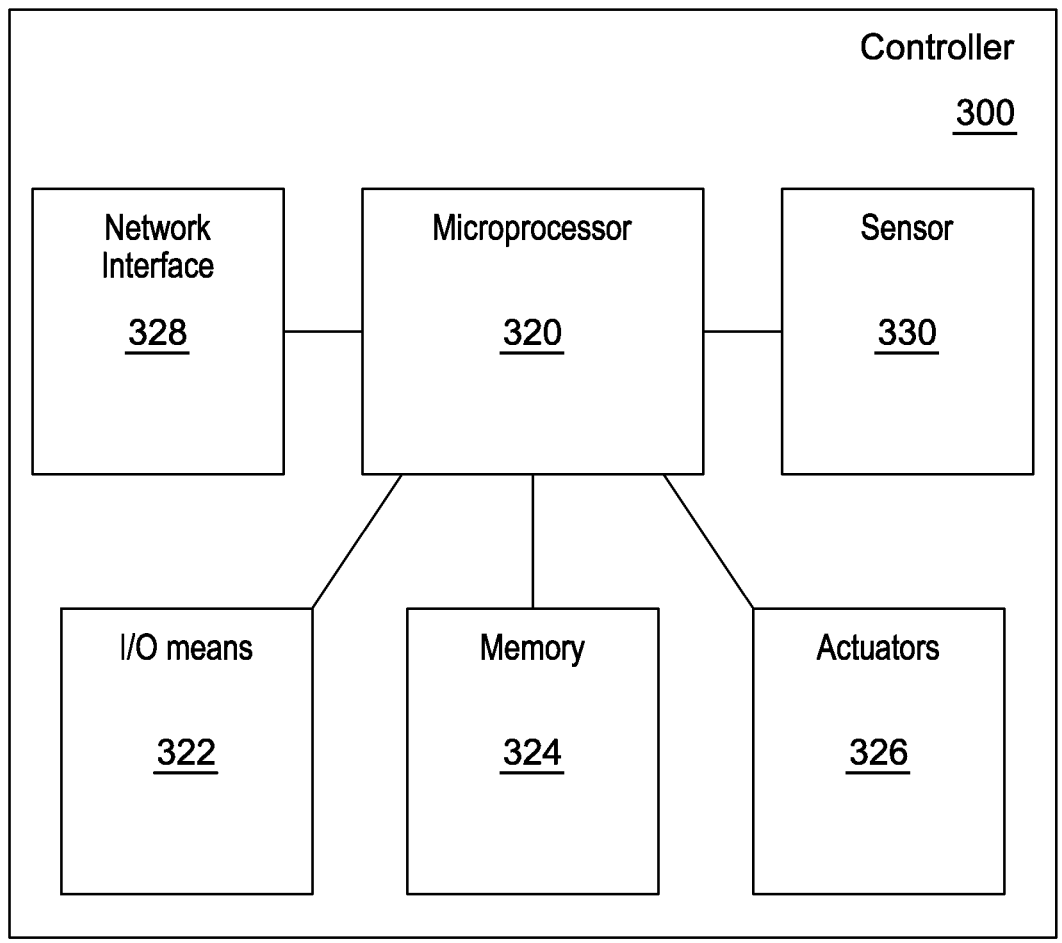
FIG. 3 shows a block diagram of a system for implementing elements of the approach described herein.
Figure 4:
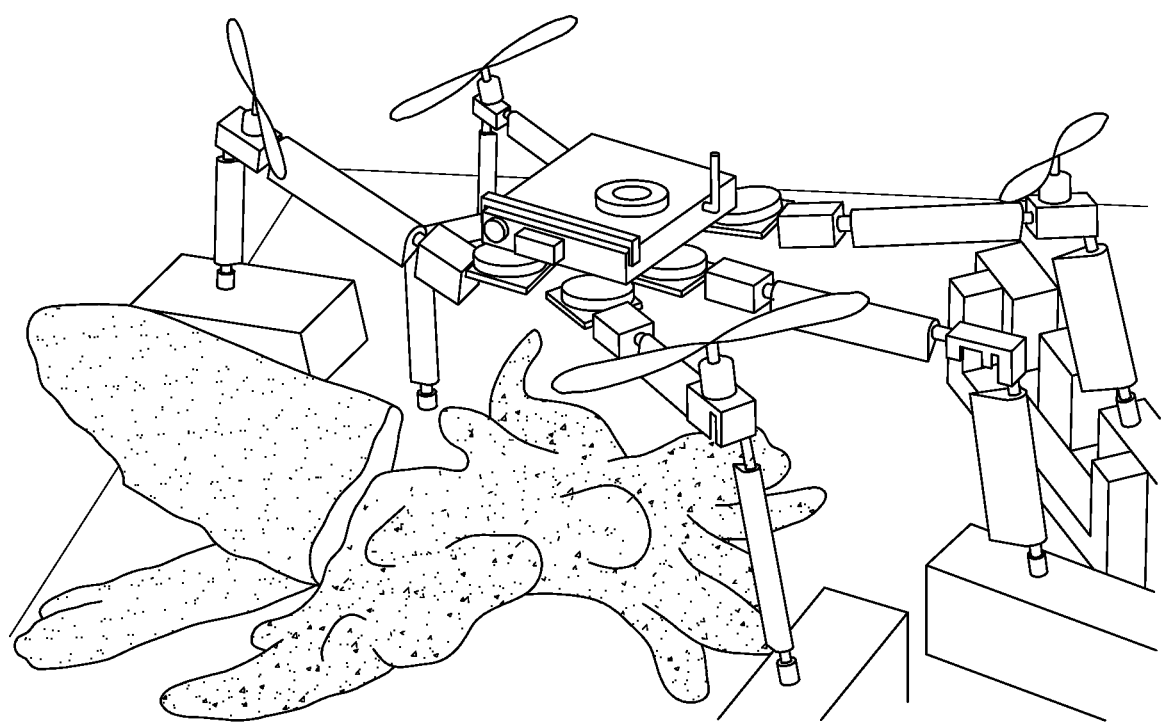
FIG. 4 shows an implementation of a robotic vehicle.
Figure 5:
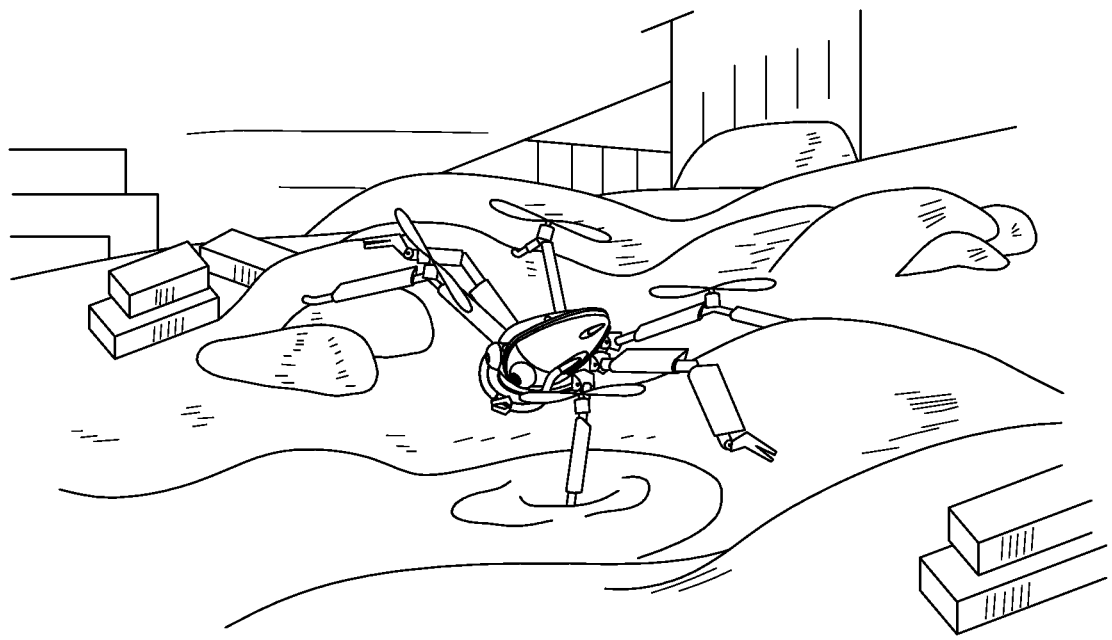
FIG. 5 shows a robotic vehicle walking over terrain.

FIG. 3 shows a block diagram of a system for operating, and contained within, the robotic 100 as described herein. In particular, a controller 300 comprises a microprocessor 320 arranged to execute computer-readable instructions as may be provided to the controller 300 via input/output means 322 which may be arranged, without limitation, to interface with one or more wired or wireless ports, for example a USB port. The microprocessor 320 may also store instructions in a memory 324, for example a random access memory. The microprocessor 320 is arranged to output results of executed programmes at the input/output means 322, and/or may communicate those results to another device via a network interface 328 that is arranged to couple, preferably in a wireless manner, the controller 300 to a communications network such as the internet (not shown in FIG. 3). The microprocessor 320 may further control the actuators 326 based upon executed programs. The microprocessor 320 may be further arranged to receive instructions and/or data via the network interface 328, and to receive sensor data from one or more sensors 330.

Figure 6:
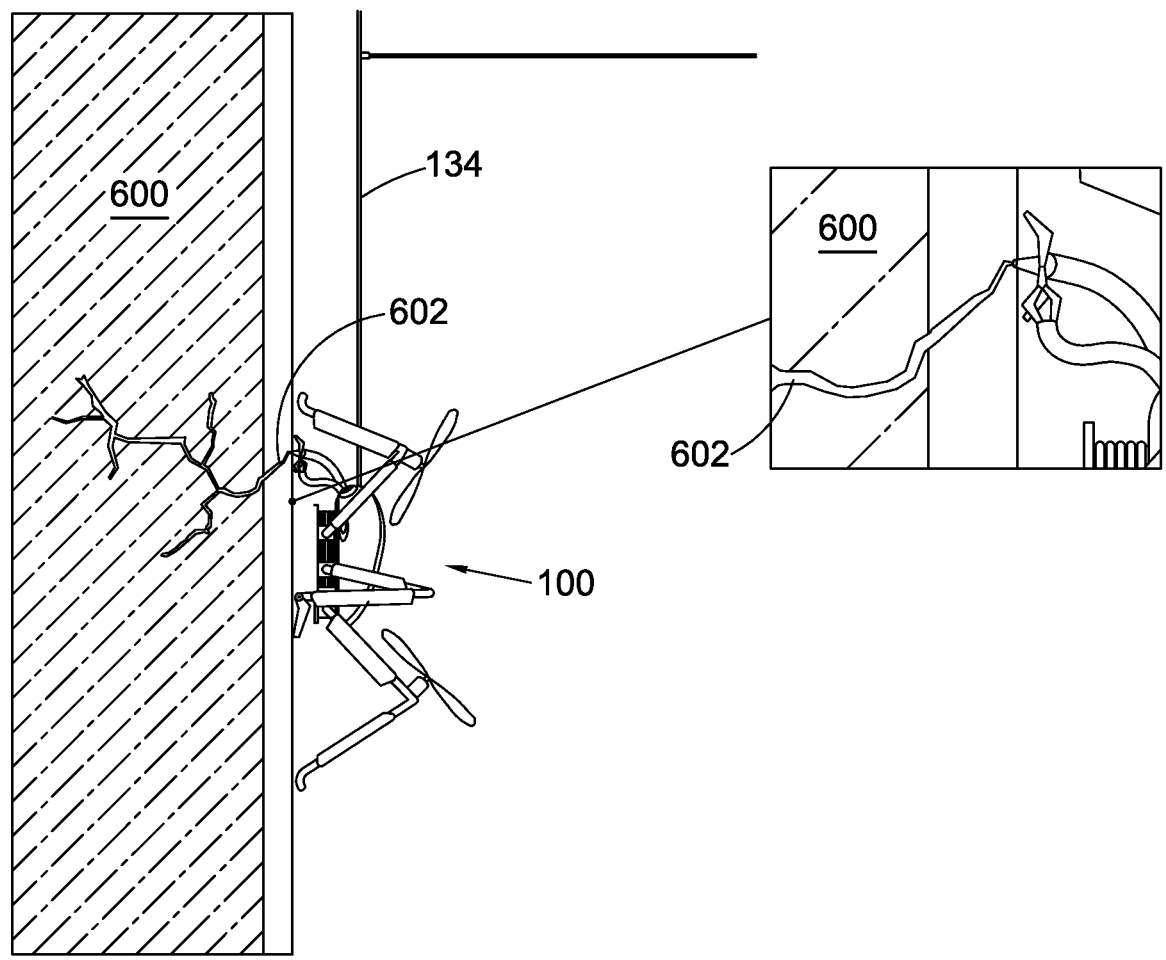
FIG. 6 an abseiling robotic vehicle.
Figure 7:
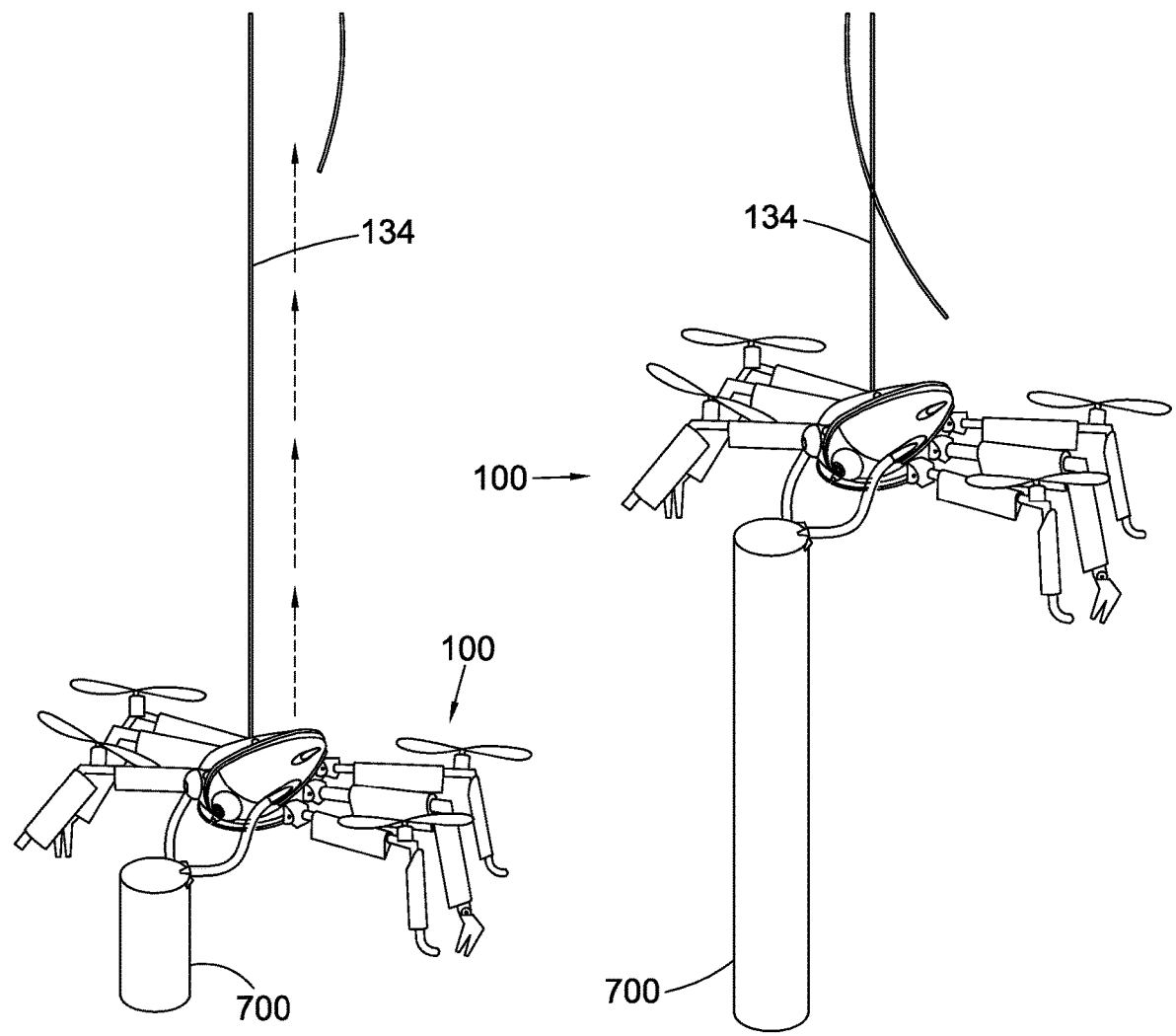
FIG. 7 shows suspended robotic vehicles.
Figure 8:
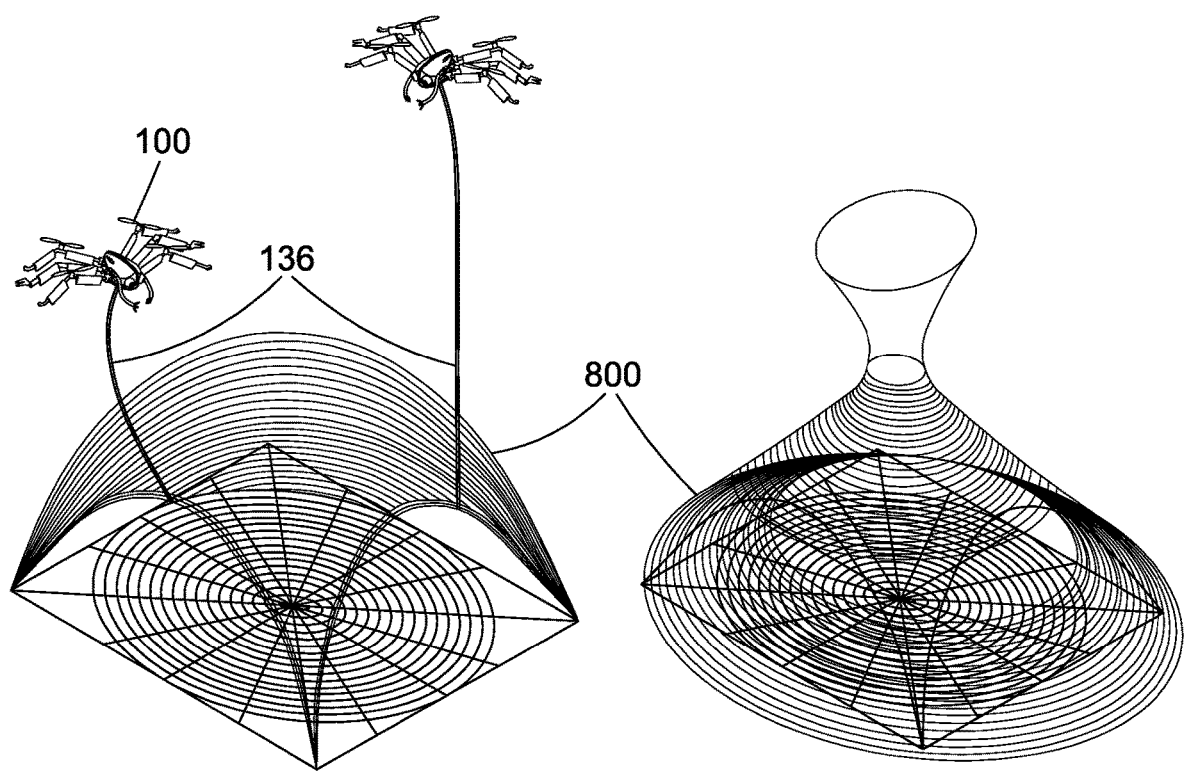
FIG. 8 shows robotic vehicles weaving.
Figure 9:
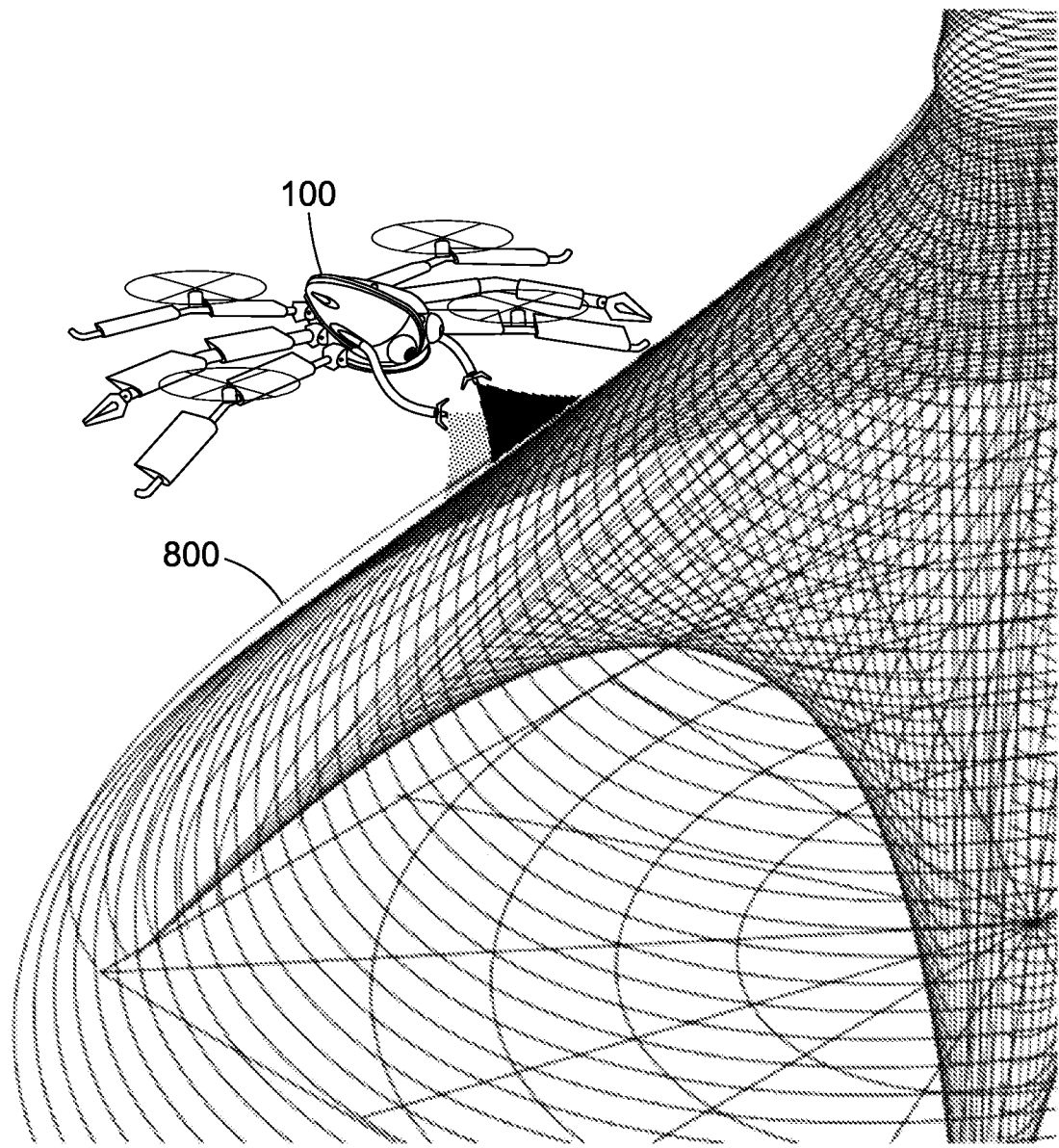
FIG. 9 shows a robotic vehicle spraying.
Figure 10:
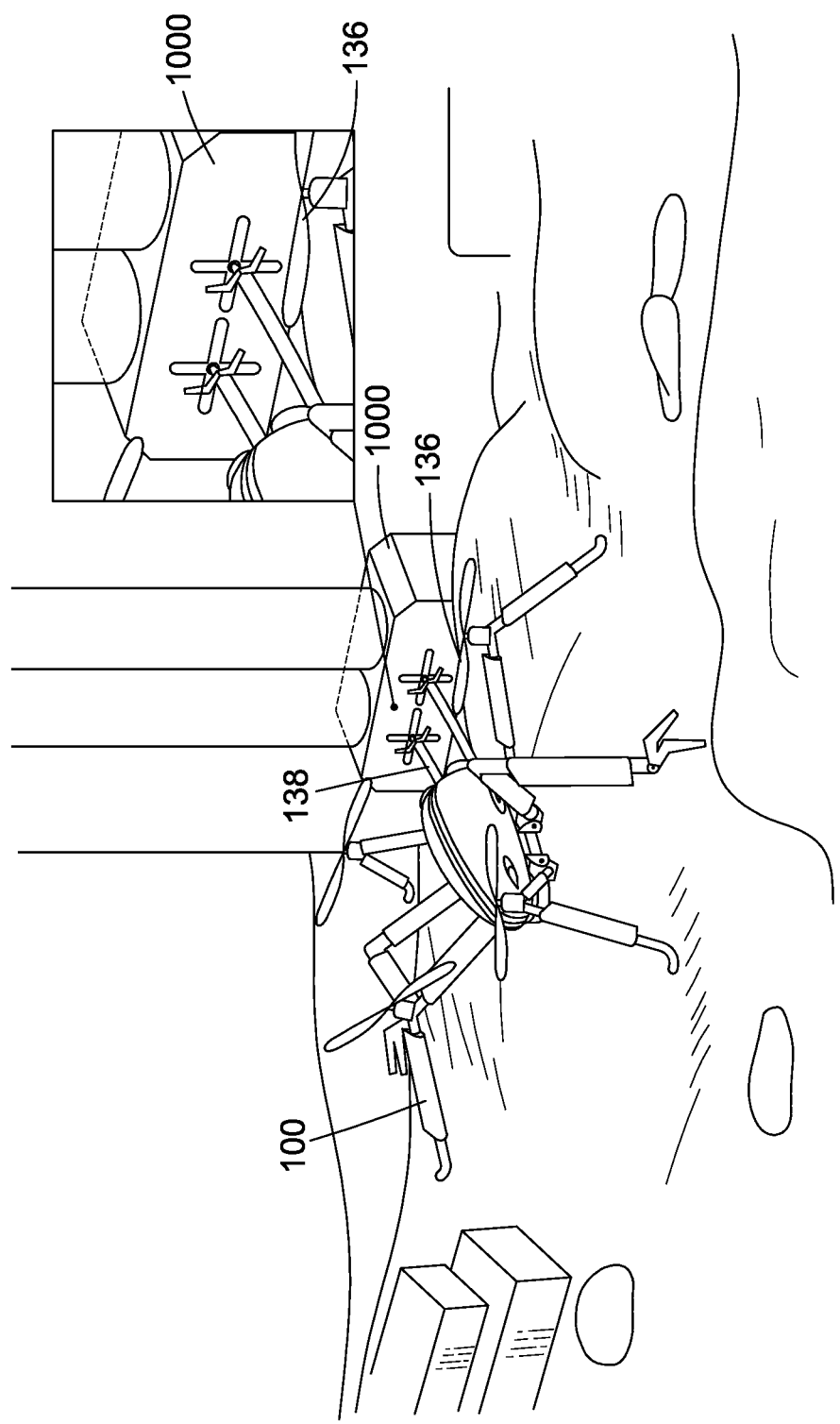
FIG. 10 shows a robotic vehicle recharging.

FIG. 6 shows the robotic vehicle 100 abseiling by the filament 134 against a wall 600 whilst the robotic device applies adhesive to a fissure 602 of the wall 600. FIG. 7 shows a pair of robotic vehicle 100 each suspended by a respective filament 134 whilst the robotic vehicles dynamically cast tubular structures 700. FIG. 8 shows a pair of robotic vehicles 100 weaving structures 800 using their filaments 134. FIG. 9 shows a robotic vehicle 100 applying a two part curable substance to a woven structure 800 so as to solidify it. FIG. 10 shows a robotic vehicle 100 coupling its arms 136, 138 to a recharging station 1000 so as to enable the robotic vehicle to refill its reservoirs.

Although the example robotic vehicles shown in the Figures have six legs in total, as another possibility, the robotic vehicle may have more or fewer legs. When controlling a six legged robotic vehicle in a walking mode, the controller may control the legs so as to move them in a manner similar to the manner that an ant walks. Likewise, when the robotic vehicle has two, four, or eight legs, the controller may control the legs so as to move them in a similar manner to that by which respectively a biped, a quadruped, or an octoped walks. Where the robotic vehicle has yet more legs, the controller may control the legs so as to move them in a similar manner to that by which a centipede or millipede walks.

Although the legs shown in the figures have upper and lower leg portions joined by a knee joint, as another possibility, one or more of the legs may not have such a knee joint. Additionally or alternatively, one or more of the legs may have one or more additional joints, for example an ankle joint and further possible a toe joint.

Although the examples in the figures show legs coupled to the body by way of four degree of freedom joints, and upper legs portions coupled to lower leg portions by way of two degree of freedom joints, those joints may have more or fewer degrees of freedom.

Although the example robotic vehicles shown in the figures have four propellers and do not have any propeller on the body thereof, the robotic vehicle may have more or fewer propellers and may have one or more propellers on its body.

As one possibility, instead of each leg having first and second wing portions, one or more legs may have none, one, or more that two wing portions.

As one possibility, for situations where a two part curable substance, such as a glue is to be dispensed by the robotic vehicle, the robotic vehicle may have a reservoir for each part of the curable substance and have substance dispensers mounted on two arms so that each arm can dispense one of the two parts.

It will be understood that known means are available for controlling the articulation of the various joints described herein. In particular, actuators for articulating the leg and arm joints, the wing portions, the manipulators, propellers, and filament dispenser include servo motors, solenoids, electrically activatable memory materials, and motors.

There is described herein a robotic vehicle that has legs and propellers to enable it to walk, fly, and or swim.

There is described herein a robotic platform capable of multi-modal locomotion, comprising hover-based flight, aerodynamic flight, walking on solid terrain and propeller/hydrodynamic based locomotion in water. This is enabled by 6 independently controlled 4-degree-of-freedom legs (horizontal, vertical and axial rotational movement at the attachment point of the legs to the body of robot, and a further single actuated hinge partway down the leg span). Propellers are mounted partway along the length of each leg to provide propulsion, and are independently controlled from a centralised flight controller. By manipulating various combinations of these servomotors to adjust the leg positions, and flight motors to adjust propeller velocities, the robot may perform any of the range of motions described above, far beyond the capabilities of any single presently existing robotic platform. In addition, the robot carries a modular payload attached to the core body itself that may perform a variety of functions either independently in conjunction with leg motions, including thread extrusion, mechanical manipulation or substance (e.g. adhesive) deposition.

The approaches described herein may be embodied on a computer-readable medium, which may be a non-transitory computer-readable medium. The computer-readable medium carrying computer-readable instructions arranged for execution upon a processor so as to make the processor carry out any or all of the methods described herein.

Applications of the devices described herein include the transport of payloads, the building of intricate structures, manipulation (welding, adhesion, subtractive methods, polishing, cleaning etc.) as well as digging and injecting of material into the soil, such as plant seed, fertiliser, pesticide etc. Vehicles could also be used to remove weed in smart farming applications using its manipulators, chemical or laser/UV ablation. Further applications include amorphous construction, brick and mortar approach, adhesion of prefabricated panels) as well as servicing, repair and surface inspection.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

As will be appreciated by those skilled in the art, the components of the aerial device can be produced via additive manufacturing, for example via the use of a 3D printer. First, a computer-readable file containing data representative of an aerial device is produced. The data may be representative of the geometry of successive cross-sections of the component. This data is often called 'slice' or 'layer' data. The data can be produced from a Computer Aided Design (CAD) file, or via the use of a 3D scanner. A 3D printer can then successively lay down layers of material in accordance with the cross-section data to produce the aerial device components.

The invention claimed is:

1. A robotic vehicle comprising:
    a body;
    a plurality of legs, each leg being moveably coupled to the body and having a propeller rotatably coupled thereto; and
    a controller operable:
        in a first mode, to cause the plurality of legs to move relative to the body so as to provide motive force for walking the robotic vehicle; and
        in a second mode, to cause the propellers to rotate relative to the legs that they are coupled to so as to provide thrust for flying the robotic vehicle and/or propelling the robotic vehicle in a liquid.

2. The robotic vehicle of claim 1, further comprising at least one additional leg moveably coupled to the body, wherein the controller is operable, in the first mode, to cause the at least one additional leg to move relative to the body so as to provide motive force for walking the robotic vehicle.

3. The robotic vehicle of claim 1, wherein each leg comprises:
    a knee joint;
    an upper leg portion moveably coupled to the body and the knee joint; and
    a lower leg portion moveably coupled to the knee joint so as to be moveable relative to the upper leg portion, and wherein the controller is operable to cause the lower leg portion to move relative to the upper leg portion.

4. The robotic vehicle of claim 1, wherein at least one of the legs comprises a wing portion, and further wherein the controller is operable in the second mode, to cause that wing portion to move relative to the body so as to influence a fluid flow around the robotic vehicle.

5. The robotic vehicle of claim 3, wherein at least one of the upper leg portions comprises a first wing portion, and further wherein the controller is operable in the second mode, to cause that first wing portion to move relative to the body so as to influence a fluid flow around the robotic vehicle.

6. The robotic vehicle of claim 3, wherein at least one of the lower leg portions comprises a second wing portion, and further wherein the controller is operable in the second mode, to cause that second wing portion to move relative to the body so as to influence a fluid flow around the robotic vehicle.

7. The robotic vehicle of claim 4, wherein one or more of the wing portions are arranged to act as aerofoils.

8. The robotic vehicle of claim 1, wherein each leg is moveably coupled to the body by way of a four degree of freedom joint.

9. The robotic vehicle of claim 1, wherein at least one of the legs has, at a distal end thereof, a manipulator element for manipulating objects.

10. The robotic vehicle of claim 1, further comprising a filament dispenser for feeding out and/or retracting a filament.

11. The robotic vehicle of claim 10, wherein the filament dispenser is operable to sever the filament.

12. The robotic vehicle of claim 1, further comprising a substance dispenser for dispensing a curable substance.

13. The robotic vehicle of claim 1, further comprising a pair of substance dispensers for respectively dispensing first and second substances that, upon combination, become curable.

14. The robotic vehicle of claim 13, further comprising a pair of arms moveably coupled to the body, wherein each of the pair of substance dispensers is fixedly coupled to a respective one of the arms.

15. The robotic vehicle of claim 12, wherein the substance dispenser or substance dispensers comprise spray nozzles.

16. The robotic vehicle of claim 1, further comprising an arm moveably coupled to the body and having, at a distal end thereof, a manipulator element for manipulating objects.

* * * * *